March 27, 1945.   J. P. HEIT   2,372,271
TRAILER HITCH
Filed Oct. 16, 1943   3 Sheets-Sheet 1
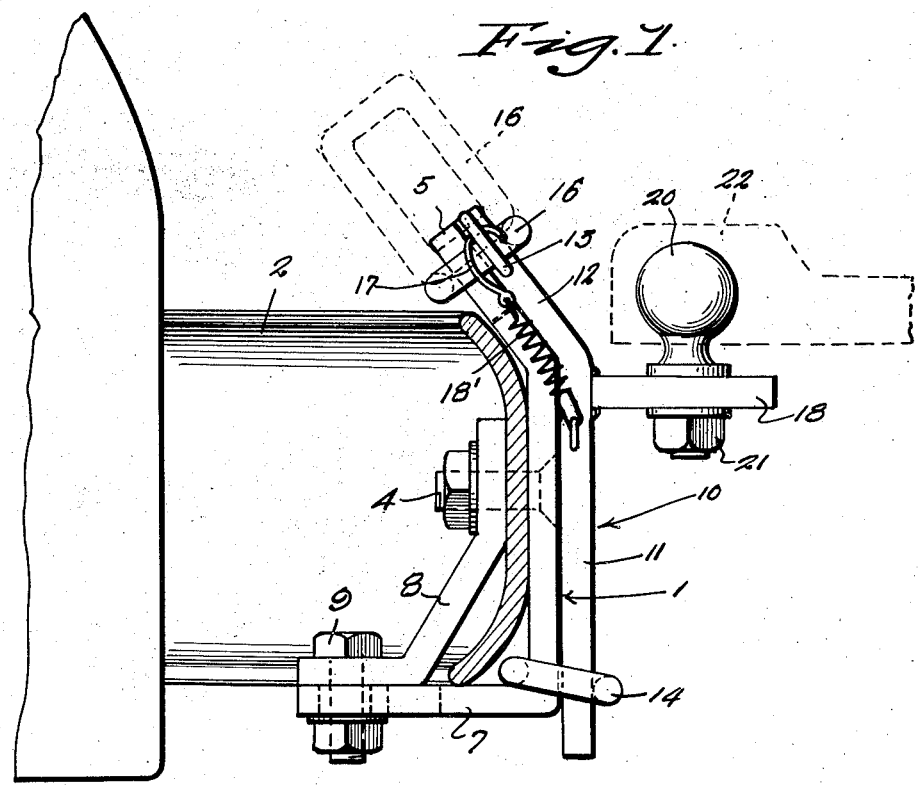
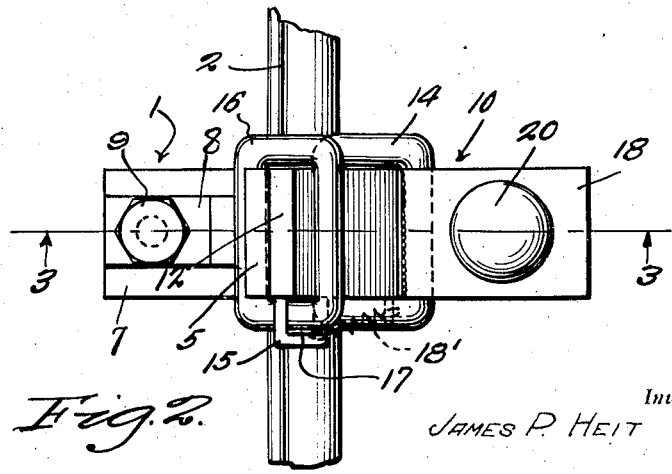
Inventor
JAMES P. HEIT
By Clarence A. O'Brien
and Harvey B. Jacobson, Attorneys March 27, 1945. J. P. HEIT 2,372,271
TRAILER HITCH
Filed Oct. 16, 1943 3 Sheets-Sheet 2
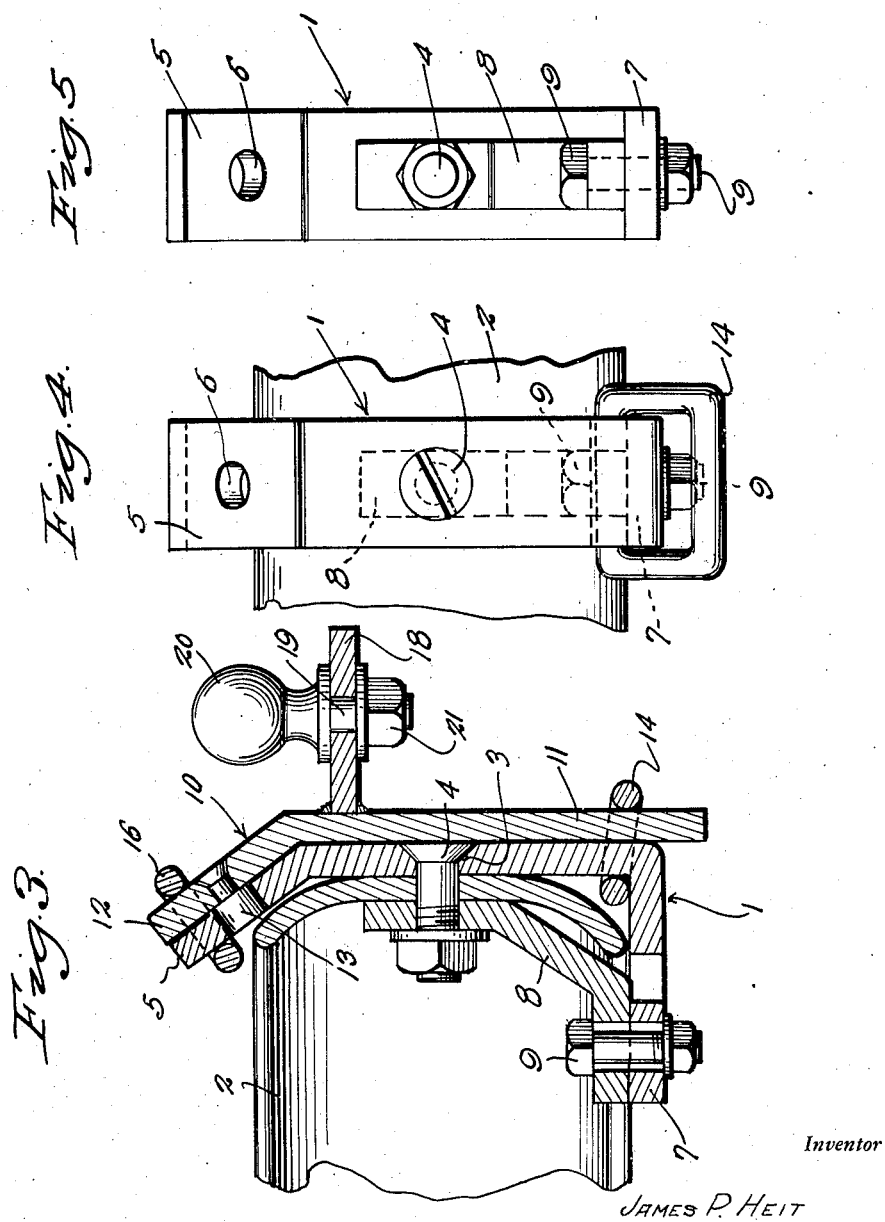
Inventor
JAMES P. HEIT
By Clarence A. O'Brien
and Harvey B. Jacobson, Attorneys March 27, 1945. J. P. HEIT 2,372,271
TRAILER HITCH
Filed Oct. 16, 1943 3 Sheets-Sheet 3
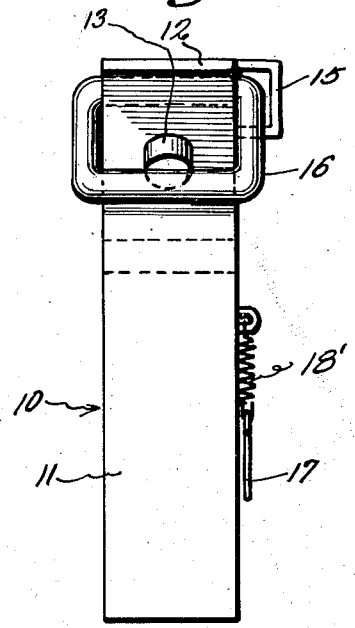
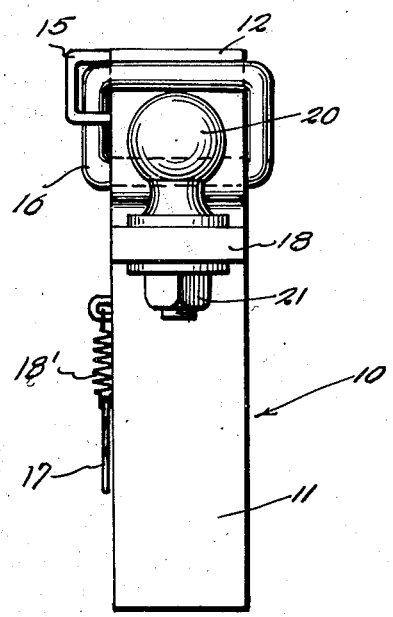
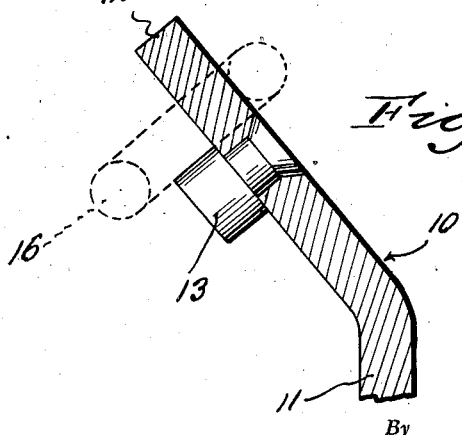
Inventor
JAMES P. HEIT
By Clarence A. O'Brien
and Harvey B. Jacobson
Attorneys Patented Mar. 27, 1945

2,372,271

UNITED STATES PATENT OFFICE 2,372,271

TRAILER HITCH

James P. Heit, Minneapolis, Minn.

Application October 16, 1943, Serial No. 506,567

4 Claims. (Cl. 280—33.44)

The present invention relates to new and useful improvements in hitches, and has for its primary object to provide, in a manner as hereinafter set forth, a device of this character comprising a novel construction and arrangement whereby a trailer may be expeditiously connected to or disconnected from the rear bumper of a motor vehicle with a minimum of effort.

Another very important object of the invention is to provide a hitch of the aforementioned character which will positively prevent accidental disconnection of the trailer at all times.

Other objects of the invention are to provide a trailer hitch of the character described which will be comparatively simple in construction, strong, durable, highly efficient and reliable in use, compact, and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 1 is a view in side elevation of a hitch constructed in accordance with the present invention, showing said hitch installed on a bumper said bumper being illustrated in cross section.

Figure 2 is a top plan view thereof.

Figure 3 is a vertical sectional view, taken substantially on the line 3—3 of Figure 2.

Figure 4 is a view in rear elevation of the stationary portion of the hitch.

Figure 5 is a view in front elevation of the stationary portion of the hitch.

Figure 6 is a view in front elevation of the removable portion of the hitch.

Figure 7 is a view in rear elevation of the removable portion of the hitch.

Figure 8 is a vertical sectional view through the upper portion of the removable bar.

Referring now to the drawings in detail, it will be seen that the embodiment of the invention which has been illustrated comprises a stationary bar of suitable metal which is designated generally by reference numeral 1. The bar 1 is adapted to be firmly secured vertically on a conventional rear vehicle bumper 2. Toward this end, the bar 1 has formed therein at an intermediate point an opening 3 which accommodates a securing bolt 4.

The bar 1 includes a forwardly inclined upper end portion 5 having an opening 6 therein. The bar 1 further includes a horizontal lower end portion 7 which extends forwardly beneath the bumper 2. A brace 8 is secured at one end by a bolt 9 to the portion 7 of the bar 1. The other end portion of the brace 8 is secured to the inside of the bumper 2 by the bolt 4. As illustrated to advantage in Figure 3 of the drawings, the bolt 4 passes through the bar 1, the bumper 2 and the brace 8.

A removable bracket 10 is mounted on the bar 1. The bracket 10 comprises a metallic bar 11 which is mounted vertically on the bar 1 and which terminates in a forwardly inclined upper end portion 12 which is engageable on the portion 5 of said bar 1. A pin 13 on the end portion 12 or the bar 11 is engageable in the opening 6 in the portion 5 of the bar 1. The lower end portion of the bar 11 is engageable in a loop 14 which is loosely mounted on the lower portion of the bar 1.

Fixed on one of the vertical edges of the upper portion 12 of the bar 11 is a loop 15. The loop 15 constitutes means for loosely mounting on the upper portion of the bracket 10 a metallic loop 16. The loop 16 is adapted to be swung downwardly over the portions 5 and 12 of the bars 1 and 11 for securing the upper ends thereof together and for preventing withdrawal of the pin 13 from the opening 6. A hook 17 is connected by a coil spring 18' to the bar 11 on one of the vertical edges thereof. The hook 17 is engageable with the loop 16 in the loop 15 for frictionally securing said loop 16 in operative position on the end portions 5 and 12 of the bars 1 and 11, respectively.

Projecting rearwardly from the bar 11 is a plate 18. The plate 18 is apertured to accommodate the stud 19 of a ball 20. A nut 21 secures the ball 20 in position. The ball 20 is engageable in the usual socket 22 on the forward end of the draw bar or tongue of the trailer.

It is thought that the manner in which the hitch functions will be readily apparent from a consideration of the foregoing. Briefly, to mount the bracket 10 on the bar 1, the lower end portion of the bar 11 is slipped downwardly through the loop 14 and the pin 13 is engaged in the opening 6. The loop 16 is then swung downwardly over the upper end portions 5 and 12 of the bars 1 and 11, respectively, for preventing separation thereof. Of course, to remove the bracket 10, the foregoing operation is substantially reversed. With the bracket 10 removed, the bar 1 may function as a bumper guard.

It is believed that the many advantages of a trailer hitch constructed in accordance with the present invention will be readily understood, and although a preferred embodiment of the device is as illustrated and described, it is to be understood that changes in the details of construction and in the combination and arrangement of parts may be restored to which will fall within the scope of the invention as claimed.

What is claimed is:

1. A trailer hitch comprising a bar, means for rigidly securing said bar vertically on a vehicle bumper, a loop loosely mounted on the lower portion of the bar, said bar having an opening in its upper portion, a bracket removably mounted on the bar, said bracket including a second vertical bar engaged at its lower end in the loop, a forwardly projecting rigid pin on the upper end portion of the second-named bar engaged in the opening of the first-named bar, and a ball rigidly mounted on the second-named bar.

2. A trailer hitch comprising an angular metallic bar mounted vertically on a vehicle bumper, said bar including a forwardly inclined upper end portion having an opening therein and further including a horizontal lower end portion extending forwardly beneath the bumper, a brace mounted on said lower end portion of the bar, a bolt mounted in the bar, the bumper and the brace for securing said bar and said brace to said bumper on opposite sides thereof, a bracket removably mounted on the bar, said bracket including a pin engageable in the opening in the bar, and a ball on the bracket for engagement in a socket on a trailer draw bar.

3. A trailer hitch comprising a vertical bar, means for rigidly securing said bar on a vehicle bumper, said bar having an opening in its upper end portion, a loop loosely mounted on the lower end portion of the bar, a bracket removably mounted on the bar, said bracket including a second bar engaged at its lower end in the loop, a forwardly projecting rigid pin on the upper end portion of the second-named bar engaged in the opening of the first-named bar, a swinging loop on the bracket engageable over the bars for preventing separation thereof at their upper ends, and a ball rigidly mounted on the second-named bar.

4. A trailer hitch comprising a metallic bar mounted vertically on a vehicle bumper, said bar including a forwardly inclined upper end portion having an opening therein and further including a horizontal lower end portion projecting forwardly beneath the bumper, a brace mounted on said lower end portion of the bar, a bolt securing the bar and the brace to the bumper on opposite sides thereof, a loop loosely mounted on the lower portion of the bar, a bracket removably mounted on the bar, said bracket including a metallic bar comprising an inclined upper portion engageable with the corresponding portion of the first-named bar, a pin on said upper portion of the bracket bar engageable in the opening, the lower end portion of the bracket bar being engageable in the loop, a loop mounted for swinging movement on the upper portion of the bracket and engageable over the upper portions of the bars, a plate fixed horizontally on the bracket bar, and a ball on said plate engageable in a socket on a trailer draw bar.

JAMES P. HEIT.